United States Patent Office 3,422,193
Patented Jan. 14, 1969

3,422,193
17-MONO ESTERS OF CORTICOIDS
Elliot L. Shapiro, Cedar Grove, Elliott J. Collins, Mendham, and Lawrence E. Finckenor, Wayne, N.J., assignors to Schering Corporation, Bloomfield, N.J., a corporation of New Jersey
No Drawing. Filed Aug. 11, 1966, Ser. No. 571,721
U.S. Cl. 424—243      9 Claims
Int. Cl. A61k 25/00; C07c 169/36

ABSTRACT OF THE DISCLOSURE

This invention relates to novel 16α-methyl-6α(X),9α,11β-dichloro-1,4-pregnadiene-17α,21-diol-3,20-dione 17-lower alkanoates wherein X is a member selected from the group consisting of hydrogen, fluoro, chloro and methyl; and to methods for preparing and using said compounds in corticoid antiinflammatory therapy.

---

This invention relates to new compositions of matter classifiable in the field of steroid chemistry as 17α-lower alkanoate esters of 16α-methyl-9α,11β-dihalo corticoids, to certain 6α-substituted derivatives thereof, and to the use of these compounds in the form of pharmaceutical formulations in the application of corticoid antiinflammatory therapy.

In one of its composition aspects the instant invention may be described as residing in the concept of a steroid compound having the molecular structure of 16α-methyl-9α,11β-dichloro-1,4-pregnadiene-17α,21-diol-3,20-dione 17-lower alkanoate and 6α-fluoro-, 6α-chloro- and 6α-methyl- derivatives thereof.

In another or its composition aspects the instant invention may be described as residing in the concept of a pharmaceutical formulation, containing as the essential active ingredient a tangible embodiment as described above.

In its process aspect this invention may be described as residing in the concept of a method of treating inflammatory conditions by the utilization of pharmaceutical formulations containing dosage units of the tangible embodiments of this invention.

The instant inveniton is based upon the discovery that the tangible embodiments disclosed herein elicit a potent antiinflammatory effect and more specifically on the discovery that these embodiments elicit a sustained antiinflammatory effect upon oral administration to mammals and in particular, domestic animals.

The novel compounds of the instant invention may be represented as a member of the group consisting of 1,4-pregnadienes having the following structural formula:

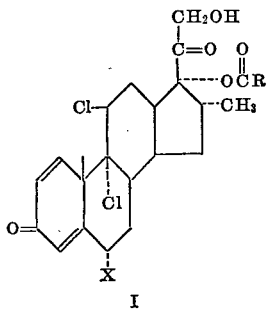

wherein X is a member selected from the group hydrogen, fluorine, chlorine and methyl and R is lower alkyl. Lower alkyl being defined herein as saturated hydrocarbon radicals being either straight or branched chain, having 2 to 4 carbon atoms. Therefore, as defined, the grouping at position 17 form esters such as propionate, butyrate, isobutyrate, valerate, 2'-methylbutyrate and isovalerate.

The tangible embodiments of this invention may be prepared as described in the following general procedures, it being understood that these procedures are of general applicability and may be used to prepare the tangible embodiments having any of the designated substituents at positions 6 and 17.

A 16α-methyl-6α-X,9α,11β - dichloro-1,4-pregnadiene-17α,21-diol-3,20-dione (II) is reacted with a mixture of lower alkanoic acid, butyric acid for example, and trifluoroacetic anhydride at about 80° for about 1 hour. The 17,21-dibutyrate product, III, is subsequently subjected to a selective acid hydrolysis to yield the 17α-monoester embodiment. The hydrolysis is usually effected by the utilization of aqueous perchloric acid in a nonreactive water miscible organic solvent. This esterification and selective hydrolysis is depicted as follows:

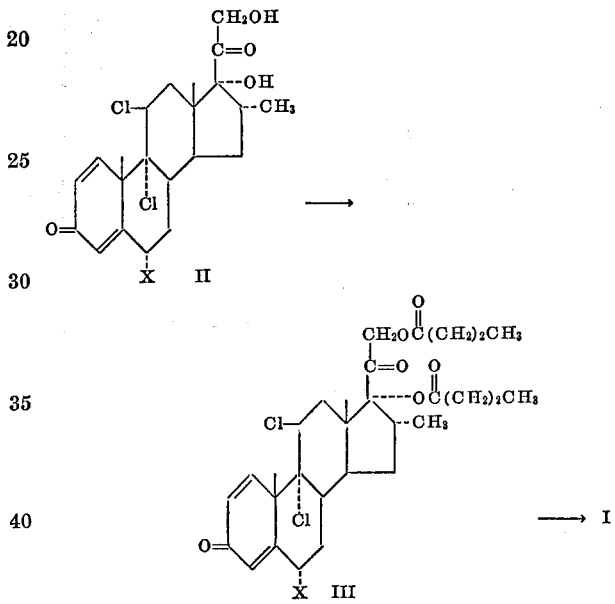

Alternatively, by treating II with a tri-loweralkyl orthoester of a lower alkanoic acid, trimethyl orthobutyrate for example, in the presence of a strong acid catalyst and a suitable nonhydroxylated organic solvent, the steroidal 17,21-methyl orthobutyrate, IV, is obtained. Mild hydrolysis of the steroidal orthoester in the presence of a weak acid, such as in an aqueous acetic acid medium, converts it to the 17α-monobutyrate embodiment. The 17α-ester can be isolated by water precipitation or by dilution with water followed by extraction with a water immiscible solvent and recovery therefrom.

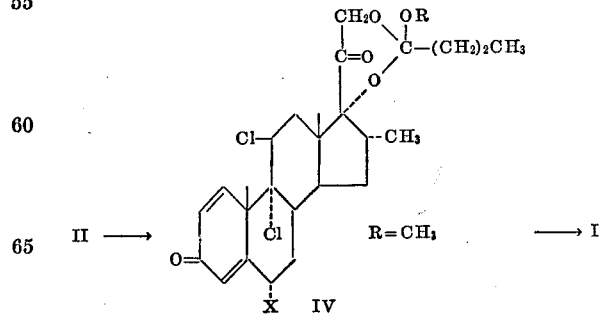

An additional procedure is that whereby II is converted to a 21-acetate V via art known techniques and the 21-acetate acylated at the 17-position with a lower alkanoic acid in combination with trifluoroacetic anhydride as analogously described heretofore, yielding the 17-lower alkanoate 21-acetate, VI. The 21-acetate function can be selectively removed by the aqueous perchloric acid technique described above.

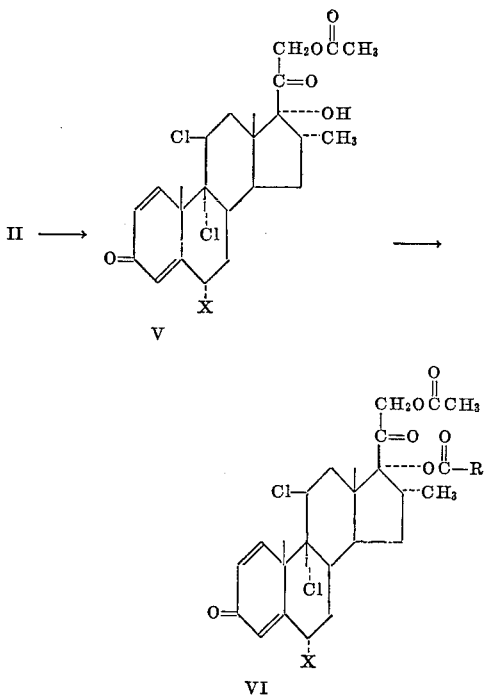

In the foregoing procedures R and X are as defined hereinbefore.

As used herein the term "strong acid catalyst" denotes such acids as p-toluenesulfonic acid, methanesulfonic acid or mineral acid as represented by perchloric or sulfuric acids. The term "nonreactive water miscible organic solvent" is meant to denote those solvents which are essentially inert to the reactants under the conditions utilized. Exemplary of such solvents are methanol, ethanol, dioxane, tetrahydrofuran and the like with methanol being the preferred solvent. The term "suitable nonhydroxylated organic solvent" as used herein means such solvents as benzene, toluene, dimethylsulfoxide, dimethylformamide, N-methyl pyrollidone and the like. Benzene is the solvent most frequently used for the orthoester formation, although the other solvents indicated may advantageously be used with starting materials having a low order of solubility in benzene.

The tangible embodiments of this invention elicit a potent antiinflammatory effect generally several times greater than their respective 17α-hydroxy analogs. They possess the unusual quality of eliciting an enhanced response as tested in dogs via the oral route. Further the embodiments manifest a sustained antiinflammatory activity through a 24 hour period after a single oral therapeutic dose. Significantly, the tangible embodiments give this prolongation of activity without sacrificing immediacy of response. Results from parallel tests, utilizing both the parent alcohols and the 17α-lower alkanoate embodiments, indicate an absence of time differential in the onset of eosinopenia between the various forms. The 17α-lower alkanoate embodiments, however, elicit an eosinopenic response long after that of the hydroxy analogs has ceased. It is generally recognized that an eosinopenic response can be normally associated with effective corticoid antiinflammatory therapy and is often used as an empirical gauge of antiinflammatory activity.

In addition to the tangible embodiments being longer acting than their respective 17α,21-diol counterparts, they are longer acting than prednisolone 21-acetate. Under controlled laboratory conditions, dogs given a single oral therapeutic dose of 16α-methyl-9α,11β-dichloro-1,4-pregnadiene-17α,21-diol-3,20-dione 17-butyrate exhibited an antiinflammatory response of longer duration than those given 10 times the therapeutic dose of prednisolone acetate. These embodiments also exhibit a more pronounced and sustained oral activity than do their 16-desmethyl analogs. In fact, the tangible embodiments of the instant invention are unique in their ability to elicit such a response after a single oral therapeutic dose.

The high potency of these embodiments coupled with their sustained action permits the attainment and maintenance of an adequate antiinflammatory action on a minimal dosage thereby maximizing the relief being derived, while minimizing the probability of the development of undesirable side effects.

The compounds disclosed herein in the form of pharmaceutical formulations, as will be described hereinafter, and by virtue of their unique prolonged activity, are eminently suited for the treatment of collagen diseases on an intermittent dosage regimen.

The following examples are set forth to further illustrate the procedures employed in preparing the compounds of this invention.

Preparation of starting materials

6α-fluoro-16α-methyl-9α,11β-dichloro-1,4-pregnadiene-17α,21-diol-3,20-dione (A) Dissolve 6.0 g. of 6α-fluoro-16α-methyl-1,4-pregnadiene-11β,17α,21-triol-3,20-dione 21-acetate in 30 ml. of dimethylformamide and 30 ml. of pyridine. Heat the solution to 80°, add 5.0 ml. of methanesulfonyl chloride and maintain at 80° for 1 hour. Add a few pieces of ice to the mixture, then precipitate the product by pouring the reaction mixture into vigorously stirred ice water. Wash the precipitate with water, dry the product and crystallize from acetone-hexane obtaining 6α-fluoro-16α-methyl - 1,4,9(11) - pregnatriene - 17α,21-diol-3,20-dione 21-acetate.

(B) Dissolve 4.12 g. of 6α-fluoro-16α-methyl-1,4,9 (11) - pregnatriene - 17α,21-diol-3,20-dione 21-acetate in 200 ml. of methylene chloride containing 4.0 ml. of pyridine. Add a solution containing 760 mg. of chlorine in 14.7 ml. of carbon tetrachloride to the steroid solution at −15°. Maintain the reaction mixture at −15° for 30 minutes then allow the solution to warm up to room temperature. Wash the solution sequentially with water, dilute acid and water. Dry the solution over anhydrous magnesium sulfate and reduce its volume, concomitantly, adding hexane to give a thick crystal slurry. Cool the slurry to 0° and hold for 1 hour. Filter and wash the product with hexane. Recrystallize from acetone to obtain 6α - fluoro - 16α-methyl-9α,11β-dichloro-1,4-pregnadiene-17α,21-diol-3,20-dione 21-acetate.

(C) Dissolve 150 mg. of the product from above in 10 ml. of methanol and 0.27 ml. of 70% perchloric acid. Permit the reaction mixture to remain at room temperature for 18 hours. Add 100 ml. of a 5% salt solution and extract the product with methylene chloride. Wash the extract with a 5% solution of sodium carbonate and with water. Dry the extract over anhydrous magnesium sulfate, filter and concentrate the filtrate to a crystal slurry. Chill the slurry to 0° and hold overnight. Filter and wash the crystalline product sparingly with ethyl ether. Dry the 6α-fluoro-16α-methyl - 9α,11β - dichloro-1,4-pregnadiene-17α,21-diol-3,20-dione at 60°.

In like manner, the above procedure may be used on the appropriately 6α-substituted starting materials to prepare:

6α-chloro-16α-methyl-9α,11β-dichloro-1,4-pregnadiene-17α,21-diol-3,20-dione
6α,16α-dimethyl-9α,11β-dichloro-1,4-pregnadiene-17α,21-diol-3,20-dione
16α-methyl-9α,11β-dichloro-1,4-pregnadiene-17α,21-diol-3,20-dione.

EXAMPLE 1

16α-methyl-9α,11β-dichloro-1,4-pregnadiene-17α,21-diol-3,20-dione 17-propionate

Dissolve 8.5 g. of 16α-methyl-9α,11β-dichloro-1,4-pregnadiene-17α,21-diol-3,20-dione in propionic acid (85 ml.). Add trifluoroacetic anhydride (30 ml.) with stirring and heat the mixture to 80° on a steam bath. Continue heating and stirring for 1 hour. Cool the mixture to 50° and add 25 ml. water. Stir for 10 minutes to allow the anhydride to hydrolyze. Cool the reaction mixture to room temperature and pour slowly into 850 ml. of vigorously stirred ice water. Extract the product with 350 ml. of methylene chloride. Wash the methylene chloride solution sequentially with water, 5% sodium bicarbonate solution and water until the washes are neutral. Dry the extract over anhydrous magnesium sulfate, filter and concentrate to a residue. Dissolve the residue in ethyl acetate and crystallize to obtain 16α-methyl-9α,11β-dichloro-1,4-pregnadiene-17α,21-diol-3,20-dione 17,21-dipropionate.

Dissolve 5 g. of the dipropionate prepared above in 350 ml. methyl alcohol and add 9.0 ml. 70% perchloric acid. Stir the mixture at room temperature overnight (18 hours) and dilute the solution with 5 volumes of salt water. Extract the product with methylene chloride, wash the extract with water, a 5% aqueous sodium bicarbonate solution and finally with water until the washes are neutral. Dry the organic solvent layer over magnesium sulfate, filter and concentrate filtrate to a residue. Dissolve the residue in ethyl acetate at reflux. Filter the hot solution, concentrate to a crystal slurry and cool to 5°. Filter the crystalline suspension to obtain 16α-methyl-9α,11β-dichloro-1,4-pregnadiene-17α,21-diol-3,20-dione 17-propionate.

In like manner by employing the appropriately 6α-substituted steroid 17α,21-diol starting material, by using the process of this example and the appropriate lower-alkanoic acid the following embodiments are prepared:

16α-methyl-9α,11β-dichloro-1,4-pregnadiene-17α,21-diol-3,20-dione 17-butyrate
16α-methyl-9α,11β-dichloro-1,4-pregnadiene-17α,21-diol-3,20-dione 17-isobutyrate
16α-methyl-9α,11β-dichloro-1,4-pregnadiene-17α,21-diol-3,20-dione 17-valerate
16α-methyl-9α,11β-dichloro-1,4-pregnadiene-17α,21-diol-3,20-dione 17-isovalerate
16α-methyl-9α,11β-dichloro-1,4-pregnadiene-17α,21-diol-3,20-dione 17-(2′-methylbutyrate)
6α,16α-dimethyl-9α,11β-dichloro-1,4-pregnadiene-17α,21-diol-3,20-dione 17-butyrate
6α,16α-dimethyl-9α,11β-dichloro-1,4-pregnadiene-17α,21-diol-3,20-dione 17-valerate
6α,16α-dimethyl-9α,11β-dichloro-1,4-pregnadiene-17α,21-diol-3,20-dione 17-isobutyrate
6α,16α-dimethyl-9α,11β-dichloro-1,4-pregnadiene-17α,21-diol-3,20-dione 17-isovalerate
6α,16α-dimethyl-9α,11β-dichloro-1,4-pregnadiene-17α,21-diol-3,20-dione 17-(2′-methylbutyrate)
16α-methyl-6α,9α,11β-trichloro-1,4-pregnadiene-17α,21-diol-3,20-dione 17-propionate
16α-methyl-6α,9α,11β-trichloro-1,4-pregnadiene-17α,21-diol-3,20-dione 17-butyrate
16α-methyl-6α,9α,11β-trichloro-1,4-pregnadiene-17α,21-diol-3,20-dione 17-isobutyrate
16α-methyl-6α,9α,11β-trichloro-1,4-pregnadiene-17α,21-diol-3,20-dione 17-valerate
16α-methyl-6α,9α,11β-trichloro-1,4-pregnadiene-17α,21-diol-3,20-dione 17-isovalerate
16α-methyl-6α,9α,11β-trichloro-1,4-pregnadiene-17α,21-diol-3,20-dione 17(2′-methylbutyrate)
16α,methyl-6α-fluoro-9α,11β-dichloro-1,4-pregnadiene-17α,21-diol-3,20-dione 17-propionate
16α-methyl-6α-fluoro-9α,11β-dichloro-1,4-pregnadiene-17α,21-diol-3,20-dione 17-butyrate
16α-methyl-6α-fluoro-9α,11β-dichloro-1,4-pregnadiene-17α,21-diol-3,20-dione 17-isobutyrate
16α-methyl-6α-fluoro-9α,11β-dichloro-1,4-pregnadiene-17α,21-diol-3,20-dione 17-valerate
16α-methyl-6α-fluoro-9α,11β-dichloro-1,4-pregnadiene-17α,21-diol-3,20-dione 17-isovalerate
16α-methyl-6α-fluoro-9α,11β-dichloro-1,4-pregnadiene-17α,21-diol-3,20-dione 17(2′-methylbutyrate)

EXAMPLE 2

6α,16α-dimethyl-9α,11β-dichloro-1,4-pregnadiene-17α,21-diol-3,20-dione 17-butyrate Dissolve 17.4 g. of 6α,16α-dimethyl-9α,11β-dichloro-1,4-pregnadiene-17α,21-diol-3,20-dione in 525 ml. of benzene. Add 17 ml. of trimethyl orthobutyrate and 0.5 g. of paratoluenesulfonic acid monohydrate. Stir the resulting solution for ½ hour at reflux. Add 5.0 g. of solid sodium bicarbonate and 5.0 ml. of triethylamine. Stir the mixture for 15 minutes. Cool to room temperature and filter. Concentrate the filtrate to a residue obtaining the 17,21-methyl orthobutyrate ester of the starting material.

Dissolve the 17,21-methyl orthobutyrate residue in 175 ml. of a 95% acetic acid-5% water mixture with external cooling. Stir the solution at room temperature for 15–20 hours. Precipitate the product by the addition of 10 volumes of water. Collect the precipitate on a suitable filter and water wash it free of acid. Dry the product and crystallize from acetone-hexane to yield the purified 6α,16α-dimethyl-9α,11β-dichloro-1,4-pregnadiene-17α,21-diol-3,20-dione 17-butyrate.

By the utilization of the procedure of this example, by varying the 6α-substituent on the 17α,21-diol starting material and by selecting the tri-lower alkyl ortho ester of the appropriate lower alkanoic acid, 17α-lower alkanoate esters may be prepared of which the following are exemplary:

16α-methyl-6α-fluoro-9α,11β-dichloro-1,4-pregnadiene-17α,21-diol-3,20-dione 17-propionate
16α-methyl-6α-fluoro-9α,11β-dichloro-1,4-pregnadiene-17α,21-diol-3,20-dione 17 butyrate
16α-methyl-6α-fluoro-9α,11β-dichloro-1,4-pregnadiene-17α,21-diol-3,20-dione 17-isobutyrate
16α-methyl-6α-fluoro-9α,11β-dichloro-1,4-pregnadiene-17α,21-diol-3,20-dione 17-valerate
16α-methyl-6α-fluoro-9α,11β-dichloro-1,4-pregnadiene-17α,21-diol-3,20-dione 17-isovalerate
16α-methyl-6α-fluoro-9α,11β-dichloro-1,4-pregnadiene-17α,21-diol-3,20-dione 17-(2′-methylbutyrate)
16α-methyl-9α,11β-dichloro-1,4-pregnadiene-17α,21-diol-3,20-dione 17-propionate
16α-methyl-9α,11β-dichloro-1,4-pregnadiene-17α,21-diol-3,20-dione 17-butyrate
16α-methyl-9α,11β-dichloro-1,4-pregnadiene-17α,21-diol-3,20-dione 17-isobutyrate
16α-methyl-9α,11β-dichloro-1,4-pregnadiene-17α,21-diol-3,20-dione 17-valerate
16α-methyl-9α,11β-dichloro-1,4-pregnadiene-17α,21-diol-3,20-dione 17-isovalerate
16α-methyl-9α,11β-dichloro-1,4-pregnadiene-17α,21-diol-3,20-dione 17-(2-methylbutyrate)
16α-methyl-6α,9α,11β-trichloro-1,4-pregnadiene-17α,21-diol-3,20-dione 17-propionate
16α-methyl-6α,9α,11β-trichloro-1,4-pregnadiene-17α,21-diol-3,20-dione 17-butyrate
16α-methyl-6α,9α,11β-trichloro-1,4-pregnadiene-17α,21-diol-3,20-dione 17-isobutyrate
16α-methyl-6α,9α,11β-trichloro-1,4-pregnadiene-17α,21-diol-3,20-dione 17-valerate
16α-methyl-6α,9α,11β-trichloro-1,4-pregnadiene-17α,21-diol-3,20-dione 17-isovalerate
16α-methyl-6α,9α,11β-trichloro-1,4-pregnadiene-17α,21-diol-3,20-dione 17-(2′-methylbutyrate)
6α,16α-dimethyl-9α,11β-dichloro-1,4-pregnadiene-17α,21-diol-3,20-dione 17-propionate 6α,16α-dimethyl-9α,11β-dichloro-1,4-pregnadiene-17α,21-diol-3,20-dione 17-isobutyrate 6α,16α-dimethyl-9α,11β-dichloro-1,4-pregnadiene-17α,21-diol-3,20-dione 17-valerate 6α,16α-dimethyl-9α,11β-dichloro-1,4-pregnadiene-17α,21-diol-3,20-dione 17-isovalerate 6α,16α-dimethyl-9α,11β-dichloro-1,4-pregnadiene-17α,21-diol-3,20-dione 17-(2′-methylbutyrate)

EXAMPLE 3

6α-Fluoro-16α-methyl-9α,11β-dichloro-1,4-pregnadiene-17α,21-diol-3,20-dione 17-valerate Dissolve 2.0 g. of 6α - fluoro - 16α - methyl - 9α,11β-dichloro - 1,4 - pregnadiene - 17α,21 - diol - 3,20 - dione 21-acetate in 20 ml. of valeric acid and 7 ml. trifluoroacetic anhydride. Heat the mixture with stirring to 80° on a steam bath. Maintain both the heating and stirring for 1 hour. Cool the reaction mixture to 50°, add 5 ml. of water and stir for 10 minutes. Cool the solution to room temperature and pour the solution into 200 ml. of ice water with stirring. Extract the product with 50 ml. of methylene chloride. Wash the methylene chloride solution with water, with dilute sodium bicarbonate and again with water until the extract is neutral. Dry the extract over anhydrous magnesium sulfate and concentrate the solution to a residue. Dissolve the residue in 140 ml. of methanol, add 3.6 ml. of 70% perchloric acid and allow the mixture to remain at room temperature overnight (18 hours). Pour the reaction mixture into 1400 ml. of a 5% salt solution with stirring. Extract the product with methylene chloride, wash the extract neutral with water. Dry the extract over anhydrous magnesium sulfate and concentrate the solution, with the addition of hexane, until a crystal slurry of 6α-fluoro-16α-methyl-9α,11β-dichloro-1,4-pregnadiene-17α,21-diol-3,20-dione 17- valerate is obtained. Chill the slurry to 0° C. and hold overnight. Filter and dry the product at 60° C.

In like manner, this procedure may be used on the appropriately 6α-substituted 17α-hydroxy-21-acetoxy starting material to prepare:

6α-fluoro-16α-methyl-9α,11β-dichloro - 1,4 - pregnadiene-17α,21-diol-3,20-dione 17-propionate 6α-fluoro-16α-methyl-9α,11β-dichloro - 1,4 - pregnadiene-17α-21-diol-3,20-dione 17-butyrate 6α-fluoro-16α-methyl-9α,11β-dichloro - 1,4 - pregnadiene-17α,21-diol-3,20-dione 17-isobutyrate 6α-fluoro-16α-methyl-9α,11β-dichloro - 1,4 - pregnadiene-17α,21-diol-3,20-dione 17-isovalerate 6α-fluoro-16α-methyl-9α,11β-dichloro - 1,4 - pregnadiene-17α,21-diol-3,20-dione 17-(2′methylbutyrate)

6α,16α-dimethyl-9α,11β-dichloro - 1,4 - pregnadiene-17α,21-diol-3,20-dione 17-propionate 6α,16α-dimethyl-9α,11β-dichloro - 1,4 - pregnadiene-17α,21-diol-3,20-dione 17-butyrate 6α,16α-dimethyl-9α,11β-dichloro - 1,4 - pregnadiene-17α,21-diol-3,20-dione 17-isobutyrate 6α,16α-dimethyl-9α,11β-dichloro - 1,4 - pregnadiene-17α,21,diol-3,20-dione 17-valerate 6α,16α-dimethyl-9α,11β-dichloro - 1,4 - pregnadiene-17α,21,diol-3,20-dione 17-isovalerate 6α,16α-dimethyl-9α,11β-dichloro - 1,4 - pregnadiene-17α,21-diol-3,20-dione 17-(2′-methylbutyrate)

16α-methyl-9α,11β-dichloro - 1,4 - pregnadiene-17α,21-diol-3,20-dione 17-propionate 16α-methyl-9α,11β-dichloro - 1,4 - pregnadiene-17α,21-diol-3,20-dione 17-butyrate 16α-methyl-9α,11β-dichloro - 1,4 - pregnadiene-17α,21-diol-3,20-dione 17-isobutyrate 16α-methyl-9α,11β-dichloro - 1,4 - pregnadiene-17α,21-diol-3,20-dione 17-valerate 16α-methyl-9α,11β-dichloro - 1,4 - pregnadiene-17α,21-diol-3,20-dione 17-isovalerate 16α-methyl-9α,11β-dichloro - 1,4 - pregnadiene-17α,21-diol-3,20-dione 17-(2′-methylbutyrate)

6α-chloro-16α-methyl - 9α,11β-dichloro-1,4-pregnadiene-17α,21-diol-3,20-dione 17-propionate 6α-chloro-16α-methyl - 9α,11β-dichloro-1,4-pregnadiene-17α,21-diol-3,20-dione 17-butyrate 6α-chloro-16α-methyl - 9α,11β-dichloro-1,4-pregnadiene-17α,21-diol-3,20-dione 17-isobutyrate 6α-chloro-16α-methyl - 9α,11β-dichloro-1,4-pregnadiene-17α,21-diol-2,30-dione 17-valerate 6α-chloro-16α-methyl - 9α,11β-dichloro-1,4-pregnadiene-17α,21-dial-3,20-dione 17-isovalerate 6α-chloro-16α-methyl - 9α,11β-dichloro-1,4-pregnadiene-17α,21-diol-3,20-dione 17-(2′methylbutyrate)

The tangible embodiments prepared in accordance with the foregoing procedures are to be utilized in the form of pharmaceutical compositions as described hereinbelow. It is contemplated that these embodiments may be taken orally in the form of tablets, capsules, elixirs and syrups and thereby elicit a systemic response. It is further in the contemplation of the applicants that these embodiments may be employed as topical preparations in the form of creams, lotions, ointments and aerosols. It is still further contemplated that the tangible embodiments of the instant invention be dispensed in the form of injectable compositions for intromuscular, subcutaneous and intravenous use.

The aforementioned topical formulations may optionally be of the hydrophilic or hydrophobic variety and may contain, in addition to the tangible embodiments, pigments, bacteriostatics, perfumes, anesthetics and the like. The foregoing may be included in the formulations with the proviso that they be compatible with the tangible embodiments, thereby causing no undesirable modification of the pharmacological action of the active species.

Notwithstanding the fact that the tangible embodiments exhibit topical antiinflammatory activity, their principal utility is in the form of oral preparations. In this form they can best elicit the prolonged activity which differentiates the compounds of the instant invention from the steroidal antiinflammatory agents available heretofore.

The effective dosage of these compounds depends on the severity, stage and individual characteristic of each case and is appropriately determined by the administering veterinarian or physician. In general, however, a dosage of from about 0.4 to about 2.0 mg. per kg. of body weight on a 48 hour regimen gives the desired relief. For conditions that may be characterized as subacute, a maintenance dose from the lower end of the dosage scale should suffice. In fact, it is usually desirable to administer the minimum dose that will maintain the well being of the species under treatment.

The following preparations are illustrative of the dosage forms in which the compounds of the instant invention may be employed.

Tablet—5 mg.

| | Mg. |
|---|---|
| 16α-methyl-9α,11β-dichloro-1,4 - pregnadiene - 17α,21-diol-3,20-dione 17-butyrate | 5.0 |
| Starch, food grade | 5.0 |
| Lactose (spray dried) USP | 89.5 |
| Magnesium stearate | 0.5 |

Mill the steroid to a uniform particle size and mix with the starch. Add an equal weight of lactose and blend until uniform. Transfer this blend to a larger mixing vessel, add the remainder of the lactose and blend the mixture until homogeneous. Remove a portion of the blend 10–20 mg., blend with the magnesium stearate and add back to the steroid blend. Mix until uniform and compress to desired specifications.

Capsule—5 mg.

| | Mg. |
|---|---|
| 6α,16α-dimethyl-9α,11β - dichloro-1,4-pregnadiene-17α,21-diol-3,20-dione 17-propionate | 5.0 |
| Lactose (spray dried) USP | 194.5 |
| Magnesium stearate USP | 0.5 |
| | 200.0 |

Mill the steroid to a uniform, fine particle size (150–200 mesh) and blend with approximately by 10% of the lactose in a suitable mixing vessel. Add this premix to the remainder of the lactose in a suitable mixing container and blend with the magnesium stearate until uniform and use to fill hard shell slip capsules.

Syrup—5 mg./teaspoonful

| | Mg./cc. |
|---|---|
| 16α-methyl-6α,9α,11β - trichloro-1,4-pregnadiene-17α,21-diol-3,20-dione 17-isobutyrate | 1.0 |
| Sucrose or sorbitol, USP | 150.0 |
| Glycerin | 350.0 |
| Alcohol | 50.0 |
| Flavor | q.s. |
| Coloring | q.s. |
| Water purified USP, to 1.0 cc. | |

Dissolve the steroid in the alcohol. Blend the remaining ingredients, add the steroid solution and mix until uniform. Filter the syrup using either filter pads or a filter aid for clarification and package the clear syrup in suitable sized bottles.

Parenteral aqueous suspension—25 mg./cc.

| | Mg. |
|---|---|
| 6α-fluoro-16-methyl-9α,11β-dichloro-1,4-pregnadiene-17α,21-diol-3,20-dione 17-valerate | 25.00 |
| Methylcellulose, 15 cps., USP | 0.25 |
| Sodium citrate, dihydrate, reagent | 30.00 |
| Benzyl alcohol, N.F. | 9.00 |
| Methylparaben, USP | 1.80 |
| Propylparaben, USP | 0.20 |
| Water for injection, USP, to 1.00 cc. | |

Directions for 100 cc. formulation

Charge about 45 cc. of water to a suitably sized agitated vessel and heat to 85–90°. Add the methylcellulose slowly with agitation. Add approximately 30 cc. of cold water to the solution and coil to 8°.

Dissolve the sodium citrate dihydrate in water and add this solution to the methylcellulose solution with stirring.

Dissolve the parabens in the benzyl alcohol at 30°. Add this solution to the sodium citrate-methyl cellulose solution and stir until uniform.

Sterilize the foregoing solution by filtration through a sterilizing filter into a sterile receiver. Withdraw aseptically approximately 10 cc. of the solution, suspend the steroid in the solution and mill the slurry to about 0.002 inch particle size. Aseptically add the milled steroid suspension to the batch, rinse the equipment with sterile water to the batch and adjust the volume to 100 cc. with additional sterile water. Transfer the suspension to suitable sized sterile vials under aseptic conditions.

We claim:
1. A compound selected from the group consisting of 1,4-pregnadienes of the formula:

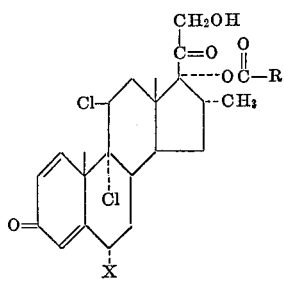

wherein X is a member selected from the group hydrogen, fluorine, chlorine and methyl and R is lower alkyl having 2 to 4 carbon atoms.

2. A compound of claim 1 wherein X is hydrogen.
3. A compound of claim 1 wherein X is fluorine.
4. A compound of claim 1 wherein X is chlorine.
5. A compound of claim 1 wherein X is methyl.
6. A compound of claim 2 wherein R is n-propyl, said compound being 16α-methyl-9α,11β-dichloro-1,4-pregnadiene-17α,21-diol-3,20-dione 17-butyrate.
7. A compound of claim 2 wherein R is isopropyl, said compound being 16α-methyl-9α,11β-dichloro-1,4-pregnadiene-17α,21-diol-3,20-dione 17-isobutyrate.
8. A pharmaceutical composition for eliciting a sustained anti-inflammatory response in mammals comprising as the essential active ingredient a therapeutically effective quantity of a compound of claim 1, in conjunction with a pharmaceutically acceptable carrier.
9. A method of eliciting a sustained anti-inflammatory response in mammals which comprises orally administering a therapeutically effective quantity of a composition of claim 8.

References Cited

UNITED STATES PATENTS

| | | | |
|---|---|---|---|
| 3,201,391 | 8/1965 | Bowers | 260—239.55 |
| 3,236,868 | 2/1966 | Bowers | 260—397.45 |
| 3,312,590 | 4/1967 | Elks et al. | 167—58 |
| 3,324,110 | 6/1967 | Nussbaum | 260—211.5 |

LEWIS GOTTS, *Primary Examiner.*

ETHEL G. LOVE, *Assistant Examiner.*

U.S. Cl. X.R.

260—239.55, 397.45